United States Patent [19]

Marshall et al.

[11] 4,170,470

[45] Oct. 9, 1979

[54] HIGH STRENGTH LEAD ALLOY

[75] Inventors: Dennis L. Marshall, Wauwatosa; Anthony Matuszewski, Milwaukee, both of Wis.

[73] Assignee: Globe-Union Inc., Milwaukee, Wis.

[21] Appl. No.: 854,256

[22] Filed: Nov. 23, 1977

Related U.S. Application Data

[63] Continuation of Ser. No. 658,889, Feb. 18, 1976, abandoned.

[51] Int. Cl.² .................... C22C 11/02; C22C 11/04; C22C 11/06
[52] U.S. Cl. .................. 75/166 D; 75/166 E; 75/167; 429/226
[58] Field of Search ............. 75/77, 78, 166 R, 166 B, 75/166 C, 166 D, 166 E, 167; 429/225, 226, 227

[56] References Cited

U.S. PATENT DOCUMENTS

| | | | |
|---|---|---|---|
| 1,158,672 | 11/1915 | Frary et al. | 75/167 |
| 1,158,673 | 11/1915 | Frary et al. | 75/167 |
| 1,500,954 | 7/1924 | Mathesius et al. | 75/167 |
| 1,520,254 | 12/1924 | Mathesius et al. | 75/167 |
| 1,549,137 | 8/1925 | Mathesius et al. | 75/167 |
| 1,703,212 | 2/1929 | Shoemaker | 75/167 |
| 1,717,469 | 6/1929 | Shoemaker | 75/167 |
| 2,013,487 | 9/1935 | Canfield et al. | 75/166 R |
| 2,040,078 | 11/1933 | Canfield | 75/167 |
| 2,159,124 | 5/1939 | Betterton et al. | 75/167 |
| 2,167,828 | 8/1939 | Dowdell et al. | 102/26 |
| 2,170,650 | 8/1939 | Bouton et al. | 429/226 |
| 2,264,251 | 11/1941 | Shoemaker | 75/167 |
| 2,364,503 | 12/1944 | Zink | 75/167 |
| 3,287,165 | 11/1966 | Jensen | 136/65 |
| 4,006,035 | 2/1977 | Mao | 429/72 |
| 4,070,192 | 1/1978 | Arbib et al. | 75/166 D |
| 4,125,690 | 11/1978 | Bagshaw et al. | 429/226 |
| 4,137,378 | 1/1979 | Nees et al. | 429/245 |

FOREIGN PATENT DOCUMENTS

| | | | |
|---|---|---|---|
| 52-42224 | 4/1977 | Japan . | |
| 712798 | 7/1954 | United Kingdom | 429/245 |
| 793083 | 4/1958 | United Kingdom | 429/245 |
| 369164 | 2/1973 | U.S.S.R. . | |
| 441320 | 8/1974 | U.S.S.R. . | |

OTHER PUBLICATIONS

*Metals and Alloys*, Aug. 1943, p. 263.
Vinol, G. C. *Storage Batteries*, 3rd Ed., (1940), pp. B, 13.
Damsa, H., et al.; *J. Phys. Chem. Solids*, vol. 34, pp. 813–816; Pergamon Press (1973).
Bruzzone, G., et al.; *Journal of the Less-Common Metals*, vol. 32, pp. 237–241.
Va Khobov, A., et al.; *Russian Metallurgy* (Melally), pp. 163–166 (1975).
*Van Nostrand's Scientific Encyclopedia* 3rd Ed., p. 1051; "Metals and Alloys".
Gray, T., Ed; *Proc. of the Int'l. Conf. on Strontium Compounds*, pp. 213–230, Atlantic Industrial Research Inst. (1973).
Bruzzone, G., et al.; *Journal of The Less-Common Metals*, vol. 39, pp. 1–6 (1975).
Bruzzone, G., et al.; *Journal of The Less-Common Metals*, vol. 35, pp. 153–157 (1974).
Marshall, D., et al., *Journal of The Electrochemical Society*, vol. 123, No. 12 (1976).
Hansen, M.; *Constitution of Binary Alloys*; McGraw Hill, pp. 405, 406, 409, 410, 1109, 1110, 1207, 1208 (1958).
Bruzzone, G.; *Journal of The Less-Common Metals*, vol. 25, pp. 361–366 (1971).
Elliot, R.; *Constitution of Binary Alloys First Supplement*; McGraw Hill, pp. 242–243, 248, 587–588, 828 (1965).

*Primary Examiner*—L. Dewayne Rutledge
*Assistant Examiner*—Michael L. Lewis
*Attorney, Agent, or Firm*—John Phillip Ryan

[57] ABSTRACT

A lead alloy particularly suited for use in lead-acid type storage batteries having the following composition by weight:

| | |
|---|---|
| Strontium | 0.01%–2.0% |
| Tin | 0.1%–5.0% |
| Aluminum | 0.005%–0.1% |
| Copper | 0–0.25% |
| Lead | balance |

36 Claims, No Drawings

HIGH STRENGTH LEAD ALLOY

This is a continuation of application Ser. No. 658,889 filed Feb. 18, 1976, and now abandoned.

BACKGROUND OF THE INVENTION

This invention relates to a new high strength lead alloy. While an alloy according to the invention finds particular utility as a grid and/or top lead material for use in lead-acid storage batteries, certain properties of the alloy make it attractive for use in other applications as well where a high strength lead is desired.

Lead-acid storage batteries typically employ lead alloys containing antimony as a primary constituent due to the effect of antimony on the physical properties of the lead. Antimony is used to increase the strength and/or other physical properties of lead, facilitating various aspects of battery manufacture. In the case of lead-acid battery grids, this is particularly important in order for the grids to withstand normal handling during battery manufacturing and service.

Recently the battery industry began producing batteries which require little or no maintenance such as adding of water to maintain the electrolyte level during the service life of a battery. In such batteries it is the practice to either seal the battery or use vent plugs for the filling ports which are not easily removed by the ultimate battery user. Since the purpose of such batteries is to eliminate the need for filling, a lead alloy system must be selected in which the supply of electrolyte will not be significantly diminished over the intended life of the battery. The presence of antimony typically causes excessive gas generation in lead-acid batteries, especially during periods of charging or overcharging, which ultimately depletes the quantity of electrolyte. In addition, excessive gassing is unacceptable in reduced or no-maintenance batteries if they are of the completely sealed type. Conventional alloys for this type of battery contain calcium in place of antimony. Calcium alloys reduce gas generation. Examples of lead-calcium alloys are seen in the following U.S. Pat. Nos. 3,920,473 issued Nov. 18, 1975 to Sims; 3,881,953 issued May 6, 1975 to Turowski; 3,287,165 issued Nov. 22, 1966 to Jensen; 2,794,707 issued June 4, 1957 to Walsh; 2,159,124 issued May 20, 1937 to Betterton et al; and 1,703,212 issued Feb. 26, 1929 to Shoemaker.

A disadvantage of the lead-calcium system is that its alloys do not generally have mechanical properties comparable to lead-antimony alloys. Since the battery industry is continually striving to make battery grids with smaller cross-sections than previously used, the strength of the lead-calcium grid alloys becomes a limiting factor in grid design. Lead-calcium systems also have a propensity to grow mechanically or creep as is well known in the art. If creep becomes excessive within a battery, adjacent parts may short out thereby disabling the battery or seriously reducing its capacity. Creep may become excessive with minor alloy compositional changes.

A further disadvantage of conventional alloys lies in the limitations on the re-use of lead scrap due to decreased pot stability. For example, melting of the scrap results in excessive drossing with a resultant loss of the calcium in the alloy. Adjustments must therefore be made in the re-melted scrap to bring the alloy composition back into a desired range prior to casting. Furthermore drossing of lead-calcium increases during mechanical agitation of the molten alloy both initially and for re-melted scrap thereby necessitating protective measures such as the use of shielded pots.

Strontium has been proposed for use in lead alloys by others. For example, U.S. Pat. No. 1,158,672 issued Nov. 2, 1915 to Frary et al, discloses a lead alloy containing a plurality of alkaline earths including calcium, barium, strontium and magnesium for use in bullets. U.S. Pat. No. 2,013,487 issued June 7, 1934 to Canfield et al, discloses a lead-strontium-tin alloy for use in lead-acid battery grids, and U.S. Pat. No. 2,040,078 issued May 12, 1936 to Canfield et al, shows a lead-strontium alloy. Finally U.S. Pat. No. 2,170,650 issued Aug. 22, 1939 to Bouton et al, shows a lead-calcium-barium-strontium alloy. These patents do not show lead alloys which have all the advantages displayed by applicant's invention however, such as dross protection, pot stability on re-melt and high strength.

SUMMARY OF THE INVENTION

An object of the present invention is to provide an improved lead alloy for use in lead-acid storage batteries and other applications where its physical and/or electrochemical properties are advantageous.

A further object of the invention is to provide a lead alloy which may be re-melted without substantial change in its composition.

Other objects and advantages of the present invention will be apparent from the description of preferred embodiments.

The invention basically comprises a lead based strontium alloy containing 0.01–2 weight % strontium, 0.1–5.0 weight % tin, 0.005–0.1 weight % aluminum, 0–0.25 weight % of copper and the balance lead.

DESCRIPTION OF THE PREFERRED EMBODIMENTS

The alloy according to the invention may be made by conventional smelting procedures. In the laboratory, research quantities of the desired alloys were prepared from master alloys which are higher in the desired constituants than the final composition. A tin-aluminum master alloy was made by dissolving the aluminum in either pure tin or a lead-tin binary alloy. Copper master alloys were prepared by dissolving elemental copper in corroding grade lead or lead-tin-aluminum ternary alloys. A lead-strontium binary alloy was purchased but conventional smelting techniques may be used to produce it. Specific compositions were made by adding proper amounts of the respective master alloys to corroding grade lead at temperatures up to 550° C. When alloying was done in air, excessive oxidation was avoided by adding tin-aluminum master alloys first followed by the strontium master alloys. The order of addition is not important if a gas shield is used to protect the pot.

Table 1 illustrates the mechanical properties of typical lead-calcium and lead-antimony alloys for use in lead-acid battery grids. In the table Sy represents the yield strength in kilograms/mm$^2$ at 0.2% offset. Su represents the ultimate tensile strength of the alloy in kilograms/mm$^2$ and El represents the percentage of elongation at ultimate strength. The balance of the alloys comprises lead. The lead which makes up the balance of the alloy in Table 1 and in all succeeding examples, comprises primary or secondary corroding grade lead having trace impurities as is commercially available in the industry. Naturally, while pure lead may be the most desirable, it is not economically justifiable for use in lead-acid storage battery grids as those skilled in the art will understand.

Table 2 sets forth various compositions of lead alloys made according to the invention. Again, the same criteria as used in Table 1 are set forth. It will be noted that in the majority of cases the lead-strontium alloys are equal to or exceed the strength of the calcium alloy. An examination of the Table 2 will also indicate that after aging 24 hours and 14 days the strontium alloys are generally superior to the calcium alloy and approach the strength of the lead-antimony alloy shown in Table 1.

We have determined that an alloy made according to the invention lies within the following range of compositions by weight percent:

| | |
|---|---|
| Strontium | 0.01%–2.0% |
| Tin | 0.1%–5.0% |
| Aluminum | 0.005%–0.1% |
| Copper | 0–0.25% |
| Lead | balance |

The strontium level has a maximum of 2 weight percent because greater quantities result in unreasonably high liquidus temperatures. Also with respect to lead acid batteries, higher percentages of strontium cause excessive precipitation of intermetallic compounds resulting in poor corrosion properties. At greater percentages of strontium increased drossing results during air firing, and the alloy would also have an excessively high cost. A minimum of 0.01% strontium is required to impart the desired strength to the alloy.

With regard to tin, 5% is an upper limit since there is no gain in mechanical behavior over 5%. Additionally, accelerated drossing results at temperatures employed in battery grid casting and greater amounts render the alloy economically unfeasible. Below 0.1% tin, age hardening takes excessively long and dross protection is reduced.

Aluminum should be present in an amount of at least 0.005% since lesser amounts will not afford proper dross protection. At quantities greater than 0.1% no additional benefits are realized and potential processing difficulties arise due to the presence of primary aluminum in the alloy.

Copper may be added to accelerate the age hardening properties of the alloy. An upper limit of 0.25% provides the maximum at which copper affects the age hardening and also affects the liquidus temperature.

The preferred range of compositions of the alloy is set forth as follows in weight percent:

| Strontium | Tin | Aluminum | Copper | Lead |
|---|---|---|---|---|
| 0.05%–0.3% | 0.25%–1.0% | 0.01%–0.1% | 0.005%–0.1% | Balance |

Alloys made according to the invention have exhibited a number of advantages over lead-calcium alloy. Such alloys have very low dross generation and excellent compositional stability, eliminating the need for frequent pot analysis and adjustment. They generally exhibit higher yield and creep strength combined with good ductility which improves processing as well as vibration resistance under severe service conditions. The alloys typically age harden rapidly allowing further processing of the grids such as pasting within 16 hours. The alloys typically can be cast at lower temperatures than lead-calcium alloys thereby reducing the frequency of mold coating and the alloy scrap may be directly re-melted and used for casting grids or battery straps or other parts. Electrochemical corrosion testing of the alloys indicates that they are superior to antimontial lead alloys and at least equal to calcium-lead alloys. Finally an alloy according to the invention is particularly well suited for cast-on-strap designs as described in U.S. Pat. No. 3,087,005 issued Apr. 23, 1963 to Sabatino et al.

While the alloy described is suitable for use in lead-acid batteries, other uses may occur to those skilled in the art. Accordingly, the scope of the invention is not to be limited by the foregoing description, but is to be taken solely by an interpretation of the claims which follow.

TABLE 1

| COMPOSITION | | | | 1 HOUR | | | 24 HOURS | | | 14 DAYS | | |
|---|---|---|---|---|---|---|---|---|---|---|---|---|
| | Sn | Ca | | Sy | Su | % El | Sy | Su | % El | Sy | Su | % El |
| | .5 | .08 | | 1.24 | 2.21 | 21.3 | 1.30 | 2.15 | 16.7 | 2.78 | 3.83 | 15.7 |
| Sb | Sn | Cu | As | | | | | | | | | |
| 4.75 | .275 | up to .06 | .275 | 2.00 | 5.85 | 31.6 | 2.78 | 6.39 | 29.0 | 4.50 | 6.37 | 15.6 |

TABLE 2

| COMPOSITION (Weight % balance Pb) | | | | 1 HOUR | | | 24 HOURS | | | 14 DAYS | | |
|---|---|---|---|---|---|---|---|---|---|---|---|---|
| Sr | Sn | Al | Cu | Sy | Su | % El | Sy | Su | % El | Sy | Su | % El |
| .2 | — | — | — | 1.80 | — | — | 1.77 | — | — | — | — | — |
| .07 | 3.05 | — | — | 1.99 | 3.44 | 19.0 | 2.76 | 3.82 | 15.2 | — | — | — |
| .14 | .96 | — | — | 3.04 | 3.86 | 10.9 | 3.97 | 4.54 | 11.7 | — | — | — |
| — | 1.05 | .056 | — | — | — | — | .74 | — | — | — | — | — |
| .052 | .94 | .1 | — | .96 | 1.95 | 28.6 | 1.37 | 2.12 | 14.4 | 2.76 | 3.45 | 13.2 |
| .06 | .31 | .025 | — | .80 | 1.70 | 35.4 | 1.02 | 1.78 | 26.2 | 2.46 | 3.05 | 10.55 |
| .062 | .51 | .05 | — | .89 | 1.95 | 41.0 | 1.30 | 2.27 | 36.8 | 3.02 | 3.72 | 15.2 |
| 0.86 | .94 | .1 | — | 1.68 | 2.79 | 27.3 | 2.89 | 3.65 | 14.0 | 3.80 | 4.42 | 9.2 |
| .09 | .68 | .075 | — | 1.65 | 2.50 | 18.6 | 3.44 | 4.13 | 11.5 | 3.70 | 4.22 | 7.30 |
| .11 | .52 | .05 | — | 1.19 | 2.40 | 33.6 | 2.78 | 3.50 | 10.4 | 4.08 | 4.56 | 8.31 |
| .11 | .31 | .025 | — | 1.02 | 1.91 | 22.4 | 1.49 | 2.20 | 12.8 | 3.47 | 4.04 | 11.00 |
| .12 | .25 | .025 | — | 1.24 | 1.96 | 19.7 | 1.54 | 2.33 | 17.7 | 3.71 | 4.37 | 9.39 |
| .12 | .45 | .05 | — | 1.22 | 2.38 | 23.4 | 3.07 | 3.60 | 7.0 | 3.50 | 3.82 | 5.10 |
| .14 | .5 | .05 | — | 1.71 | 2.68 | 16.4 | 3.06 | 3.57 | 4.7 | 3.82 | 4.25 | 8.65 |
| .14 | .92 | .1 | — | 3.91 | 4.69 | 8.92 | 3.67 | 3.80 | 2.25 | 4.25 | 4.49 | 3.8 |

TABLE 2-continued

| COMPOSITION (Weight % balance Pb) | | | | 1 HOUR | | | 24 HOURS | | | 14 DAYS | | |
|---|---|---|---|---|---|---|---|---|---|---|---|---|
| Sr | Sn | Al | Cu | Sy | Su | % El | Sy | Su | % El | Sy | Su | % El |
| .2 | 1.14 | .06 | — | 3.02 | — | — | 4.97 | — | — | — | — | — |
| .2 | — | — | .10 | — | — | — | 1.59 | — | — | — | — | — |
| .2 | .896 | .05 | .10 | — | — | — | 4.82 | — | — | — | — | — |
| .2 | .896 | .05 | .10 | — | — | — | 4.01 | — | — | — | — | — |
| .2 | 1.14 | .06 | .057 | 4.13 | — | — | 4.90 | — | — | — | — | — |

We claim:

1. An alloy for use as a battery plate grid in a lead-acid battery, comprising, by weight:

| strontium | 0.01%–about 0.3% |
|---|---|
| tin | 0.1%–5.0% |
| aluminum | 0.005%–0.1% |
| copper | 0.0%–0.25% |
| lead | balance |

2. The alloy of claim 1 comprising, by weight:

| strontium | 0.05%–0.3% |
|---|---|
| tin | 0.25%–1.0% |
| aluminum | 0.01%–0.1% |
| copper | 0.0%–0.25% |
| lead | balance |

3. The alloy of claim 2 comprising, by weight:

| strontium | 0.05%–0.3% |
|---|---|
| tin | 0.25%–1.0% |
| aluminum | 0.01%–0.1% |
| copper | 0.005%–0.1% |
| lead | balance |

4. The alloy of claim 1 consisting essentially of, by weight:

| strontium | 0.01%–about 0.3% |
|---|---|
| tin | 0.1%–5.0% |
| aluminum | 0.005%–0.1% |
| copper | 0.0%–0.25% |
| lead | balance | said alloy having sufficient mechanical strength and corrosion resistance for effective use as a battery plate grid in a lead-acid battery.

5. The alloy of claim 4 consisting essentially of, by weight:

| strontium | 0.05%–0.3% |
|---|---|
| tin | 0.25%–1.0% |
| aluminum | 0.01%–0.1% |
| copper | 0.0%–0.25% |
| lead | balance |

6. The alloy of claim 5 consisting essentially of, by weight:

| strontium | 0.05%–0.3% |
|---|---|
| tin | 0.25%–1.0% |
| aluminum | 0.01%–0.1% |
| copper | 0.005%–0.1% |
| lead | balance |

7. The alloy of claim 4 consisting essentially of, by weight:

| strontium | 0.05%–0.3% |
|---|---|
| tin | 0.1%–5.0% |
| aluminum | 0.005%–0.1% |
| copper | 0.0%–0.25% |
| lead | balance |

8. The alloy of claim 7 consisting essentially of, by weight:

| strontium | 0.05%–0.3% |
|---|---|
| tin | 0.1%–5.0% |
| aluminum | 0.01%–0.1% |
| copper | 0.0%–0.25% |
| lead | balance |

9. The alloy of claim 1 consisting of, by weight:

| strontium | 0.01%–about 0.3% |
|---|---|
| tin | 0.1%–5.0% |
| aluminum | 0.005%–0.1% |
| copper | 0.0%–0.25% |
| lead | balance |

10. The alloy of claim 9 consisting of, by weight:

| strontium | 0.05%–0.3% |
|---|---|
| tin | 0.25%–1.0% |
| aluminum | 0.01%–0.1% |
| copper | 0.0%–0.25% |
| lead | balance |

11. The alloy of claim 10 consisting of, by weight:

| strontium | 0.05%–0.3% |
|---|---|
| tin | 0.25%–1.0% |
| aluminum | 0.01%–0.1% |
| copper | 0.005%–0.1% |
| lead | balance |

12. The alloy of claim 9 consisting of, by weight:

| strontium | 0.05%–0.3% |
|---|---|
| tin | 0.1%–5.0% |
| aluminum | 0.005%–0.1% |
| copper | 0.0%–0.25% |
| lead | balance |

13. The alloy of claim 12 consisting of, by weight:

| strontium | 0.05%–0.3% |
|---|---|
| tin | 0.1%–5.0% |
| aluminum | 0.01%–0.1% |
| copper | 0.0%–0.25% |

| | |
|---|---|
| lead | balance |

14. A battery plate grid for a lead-acid battery, produced from an alloy comprising, by weight:

| | |
|---|---|
| strontium | 0.01%–about 0.3% |
| tin | 0.1%–5.0% |
| aluminum | 0.005%–0.1% |
| copper | 0.0%–0.25% |
| lead | balance |

15. The battery plate grid of claim 14 produced from an alloy comprising, by weight:

| | |
|---|---|
| strontium | 0.05%–0.3% |
| tin | 0.25%–1.0% |
| aluminum | 0.01%–0.1% |
| copper | 0.0%–0.25% |
| lead | balance |

16. The battery plate grid of claim 15 produced from an alloy comprising, by weight:

| | |
|---|---|
| strontium | 0.05%–0.3% |
| tin | 0.25%–1.0% |
| aluminum | 0.01%–0.1% |
| copper | 0.005%–0.1% |
| lead | balance |

17. The battery plate grid of claim 14 produced from an alloy consisting essentially of, by weight:

| | |
|---|---|
| strontium | 0.01%–about 0.3% |
| tin | 0.1%–5.0% |
| aluminum | 0.005%–0.1% |
| copper | 0.0%–0.25% |
| lead | balance | said alloy having sufficient mechanical strength and corrosion resistance for effective use as a battery plate grid in a lead-acid battery.

18. The battery plate grid of claim 17 produced from an alloy consisting essentially of, by weight:

| | |
|---|---|
| strontium | 0.05%–0.3% |
| tin | 0.25%–1.0% |
| aluminum | 0.01%–0.1% |
| copper | 0.0%–0.25% |
| lead | balance |

19. The battery plate grid of claim 18 produced from an alloy consisting essentially of, by weight:

| | |
|---|---|
| strontium | 0.05%–0.3% |
| tin | 0.25%–1.0% |
| aluminum | 0.01%–0.1% |
| copper | 0.005%–0.1% |
| lead | balance |

20. The battery plate grid of claim 17 produced from an alloy consisting essentially of, by weight:

| | |
|---|---|
| strontium | 0.05%–0.3% |
| tin | 0.1%–5.0% |
| aluminum | 0.005%–0.1% |
| copper | 0.0%–0.25% |
| lead | balance |

21. The battery plate grid of claim 20 produced from an alloy consisting essentially of, by weight:

| | |
|---|---|
| strontium | 0.05%–0.3% |
| tin | 0.1%–5.0% |
| aluminum | 0.01%–0.1% |
| copper | 0.0%–0.25% |
| lead | balance |

22. The battery plate grid of claim 14 produced from an alloy consisting of, by weight:

| | |
|---|---|
| strontium | 0.01%–about 0.3% |
| tin | 0.1%–5.0% |
| aluminum | 0.005%–0.1% |
| copper | 0.0%–0.25% |
| lead | balance |

23. The battery plate grid of claim 22 produced from an alloy consisting of, by weight:

| | |
|---|---|
| strontium | 0.05%–0.3% |
| tin | 0.25%–1.0% |
| aluminum | 0.01%–0.1% |
| copper | 0.0%–0.25% |
| lead | balance |

24. The battery plate grid of claim 23 produced from an alloy consisting of, by weight:

| | |
|---|---|
| strontium | 0.05%–0.3% |
| tin | 0.25%–1.0% |
| aluminum | 0.01%–0.1% |
| copper | 0.005%–0.1% |
| lead | balance |

25. The battery plate grid of claim 22 produced from an alloy consisting of, by weight:

| | |
|---|---|
| strontium | 0.05%–0.3% |
| tin | 0.1%–5.0% |
| aluminum | 0.005%–0.1% |
| copper | 0.0%–0.25% |
| lead | balance |

26. The battery plate grid of claim 25 produced from an alloy consisting of, by weight:

| | |
|---|---|
| strontium | 0.05%–0.3% |
| tin | 0.1%–5.0% |
| aluminum | 0.01%–0.1% |
| copper | 0.0%–0.25% |
| lead | balance |

27. The battery plate grid of claim 14 produced from an alloy comprising, by weight:

| | |
|---|---|
| strontium | 0.05%–0.3% |
| tin | 0.1%–5.0% |
| aluminum | 0.005%–0.1% |
| copper | 0.0%–0.25% |

-continued

| | |
|---|---|
| lead | balance |

28. The battery plate grid of claim 27 produced from an alloy comprising, by weight:

| | |
|---|---|
| strontium | 0.05%–0.3% |
| tin | 0.1%–5.0% |
| aluminum | 0.01%–0.1% |
| copper | 0.0%–0.25% |
| lead | balance |

29. An alloy comprising, by weight:

| | |
|---|---|
| strontium | 0.05%–0.3% |
| tin | 0.25%–1.0% |
| aluminum | 0.01%–0.1% |
| copper | 0.005%–0.1% |
| lead | balance |

30. A battery plate grid for a lead-acid battery, produced from an alloy comprising, by weight:

| | |
|---|---|
| strontium | 0.05%–0.3% |
| tin | 0.25%–1.0% |
| aluminum | 0.01%–0.1% |
| copper | 0.005%–0.1% |
| lead | balance |

31. The alloy of claim 1 comprising, by weight:

| | |
|---|---|
| strontium | 0.05%–0.3% |
| tin | 0.1%–5.0% |
| aluminum | 0.005%–0.1% |
| copper | 0.0%–0.25% |
| lead | balance |

32. The alloy of claim 31 comprising, by weight:

| | |
|---|---|
| strontium | 0.05%–0.3% |
| tin | 0.1%–5.0% |
| aluminum | 0.01%–0.1% |
| copper | 0.0%–0.25% |
| lead | balance |

33. The alloy comprising, by weight:

| | |
|---|---|
| strontium | 0.05%–0.3% |
| tin | 0.1%–5.0% |
| aluminum | 0.005%–0.1% |
| copper | 0.005%–0.1% |
| lead | balance |

34. The alloy of claim 33 consisting essentially of, by weight:

| | |
|---|---|
| strontium | 0.05%–0.3% |
| tin | 0.1%–5.0% |
| aluminum | 0.01%–0.1% |
| copper | 0.005%–0.1% |
| lead | balance |

35. A battery plate grid for a lead-acid battery, produced from an alloy comprising, by weight:

| | |
|---|---|
| strontium | 0.05%–0.3% |
| tin | 0.1%–5.0% |
| aluminum | 0.005%–0.1% |
| copper | 0.005%–0.1% |
| lead | balance |

36. The battery plate grid of claim 35, produced from an alloy consisting essentially of, by weight:

| | |
|---|---|
| strontium | 0.05%–0.3% |
| tin | 0.1%–5.0% |
| aluminum | 0.01%–0.1% |
| copper | 0.005%–0.1% |
| lead | balance |

* * * * *